(12) United States Patent
Nickelson et al.

(10) Patent No.: US 7,513,715 B2
(45) Date of Patent: Apr. 7, 2009

(54) SUBTERRANEAN BARRIERS, METHODS, AND APPARATUSES FOR FORMING, INSPECTING, SELECTIVELY HEATING, AND REPAIRING SAME

(75) Inventors: Reva A. Nickelson, Shelley, ID (US);
Paul A. Sloan, Rigby, ID (US); John G. Richardson, Idaho Falls, ID (US);
Stephanie Walsh, Idaho Falls, ID (US);
Kevin M. Kostelnik, Idaho, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 11/565,752

(22) Filed: Dec. 1, 2006

(65) Prior Publication Data

US 2007/0209798 A1    Sep. 13, 2007

Related U.S. Application Data

(60) Division of application No. 10/982,506, filed on Nov. 4, 2004, now Pat. No. 7,160,061, which is a continuation-in-part of application No. 10/411,534, filed on Apr. 4, 2003, now Pat. No. 6,896,446, which is a division of application No. 09/729,435, filed on Dec. 4, 2000, now Pat. No. 6,575,663, said application No. 10/982,506 is a continuation-in-part of application No. 10/358,633, filed on Feb. 4, 2003, now Pat. No. 6,910,829.

(51) Int. Cl.
*E02D 5/00*    (2006.01)
(52) U.S. Cl. ...................... 405/274; 405/281
(58) Field of Classification Search ............... 405/274, 405/276, 281
See application file for complete search history.

(56) References Cited

U.S. PATENT DOCUMENTS

| 876,306 A | * | 1/1908 | Pyle ..................... 405/280 |
| 910,421 A | | 1/1909 | Schlueter |
| 2,101,285 A | | 12/1937 | Stevens |
| 2,312,579 A | | 2/1943 | O'Brien |

(Continued)

OTHER PUBLICATIONS

Pearlman, Leslie, "Subsurface containment and Monitoring Systems: Barriers and Beyond," National Network of Environmental Management Studies Fellow for U.S. Environmental Protection Agency, Mar. 1999.

*Primary Examiner*—John Kreck
(74) *Attorney, Agent, or Firm*—Trask Britt

(57) ABSTRACT

A subterranean barrier and method for forming same are disclosed, the barrier including a plurality of casing strings wherein at least one casing string of the plurality of casing strings may be affixed to at least another adjacent casing string of the plurality of casing strings through at least one weld, at least one adhesive joint, or both. A method and system for nondestructively inspecting a subterranean barrier is disclosed. For instance, a radiographic signal may be emitted from within a casing string toward an adjacent casing string and the radiographic signal may be detected from within the adjacent casing string. A method of repairing a barrier including removing at least a portion of a casing string and welding a repair element within the casing string is disclosed. A method of selectively heating at least one casing string forming at least a portion of a subterranean barrier is disclosed.

9 Claims, 11 Drawing Sheets

U.S. PATENT DOCUMENTS

| | | | |
|---|---|---|---|
| 3,411,305 A | 11/1968 | Cella | |
| 3,424,887 A | 1/1969 | Fehlman | |
| 3,542,375 A | 11/1970 | Renwick | |
| 3,582,599 A | 6/1971 | Yohn | |
| 3,764,056 A | 10/1973 | Edwards et al. | |
| 3,858,026 A | 12/1974 | Edwards et al. | |
| 4,000,701 A | 1/1977 | Ostgaard et al. | |
| 4,075,852 A | 2/1978 | Tamaro | |
| 4,601,615 A | 7/1986 | Cavalli | |
| 4,632,602 A | 12/1986 | Hovnanian | |
| 4,664,560 A | 5/1987 | Cortlever | |
| 4,694,136 A | 9/1987 | Kasner et al. | |
| 4,694,137 A | 9/1987 | Hawkins et al. | |
| 4,931,612 A | 6/1990 | Belleride et al. | |
| 4,997,313 A | 3/1991 | Gibson et al. | |
| 5,013,165 A | 5/1991 | Newman | |
| 5,030,034 A | 7/1991 | Bodine | |
| 5,037,240 A | 8/1991 | Sherman | |
| 5,054,961 A | 10/1991 | Sherman | |
| 5,059,765 A | 10/1991 | Laing | |
| 5,106,233 A | 4/1992 | Breaux | |
| 5,127,771 A | 7/1992 | Wind | |
| 5,180,251 A | 1/1993 | Paurat et al. | |
| 5,199,816 A | 4/1993 | Paurat et al. | |
| 5,240,348 A * | 8/1993 | Breaux | 405/129.8 |
| 5,259,705 A | 11/1993 | Breaux et al. | |
| 5,354,149 A | 10/1994 | Breaux | |
| 5,360,293 A | 11/1994 | Breaux et al. | |
| 5,388,931 A | 2/1995 | Carlson | |
| 5,435,478 A | 7/1995 | Wood et al. | |
| 5,460,032 A | 10/1995 | Hampton et al. | |
| 5,487,622 A | 1/1996 | Cherry et al. | |
| 5,551,807 A | 9/1996 | Breaux | |
| 5,570,974 A | 11/1996 | Jax et al. | |
| 5,584,610 A | 12/1996 | Simpson et al. | |
| 5,593,605 A | 1/1997 | Jones | |
| 5,601,225 A | 2/1997 | Wood et al. | |
| 5,716,164 A | 2/1998 | Biro et al. | |
| 5,758,993 A | 6/1998 | Schmednecht et al. | |
| 5,765,965 A | 6/1998 | Carter, Jr. et al. | |
| 5,796,069 A | 8/1998 | Jones et al. | |
| 5,800,096 A | 9/1998 | Barrow | |
| 5,816,748 A | 10/1998 | Kleiser et al. | |
| 5,879,110 A | 3/1999 | Carter, Jr. | |
| 5,905,184 A | 5/1999 | Carter, Jr. | |
| 5,961,437 A | 10/1999 | Smith et al. | |
| 5,977,513 A | 11/1999 | Findlan | |
| 6,016,714 A | 1/2000 | Smith et al. | |
| 6,099,206 A | 8/2000 | Pennell | |
| 6,102,617 A | 8/2000 | Hampton | |
| 6,189,890 B1 | 2/2001 | Moulin et al. | |
| 6,258,273 B1 | 7/2001 | Gee | |
| 6,280,118 B1 | 8/2001 | Suthersan et al. | |
| 6,427,402 B1 | 8/2002 | White | |
| 6,575,663 B2 | 6/2003 | Richardson et al. | |
| 6,648,552 B1 | 11/2003 | Smith et al. | |
| 6,758,634 B2 | 7/2004 | Nickelson et al. | |
| 2003/0152427 A1 | 8/2003 | Nickelson et al. | |
| 2003/0175083 A1 | 9/2003 | Kostelnik et al. | |
| 2003/0190194 A1 | 10/2003 | Kostelnik et al. | |
| 2003/0198517 A1 | 10/2003 | Kostelnik et al. | |

* cited by examiner

SUBTERRANEAN BARRIERS, METHODS, AND APPARATUSES FOR FORMING, INSPECTING, SELECTIVELY HEATING, AND REPAIRING SAME

RELATED APPLICATIONS

This application is a divisional of U.S. application Ser. No. 10/982,506, filed Nov. 4, 2004, entitled SUBTERRANEAN BARRIERS INCLUDING AT LEAST ONE WELD, now U.S. Pat. No. 7,160,061, which is a continuation-in-part of application Ser. No. 10/411,534, filed Apr. 4, 2003, now U.S. Pat. No. 6,896,446, entitled ADVANCED CONTAINMENT SYSTEM, which is a divisional of application Ser. No. 09/729,435, filed Dec. 4, 2000, now U.S. Pat. No. 6,575,663 B2, entitled ADVANCED CONTAINMENT SYSTEM, the disclosure of each of which is incorporated in its entirety, respectively by reference herein. U.S. application Ser. No. 10/982,506 is also a continuation-in-part of application Ser. No. 10/358,633, filed Feb. 4, 2003, now U.S. Pat. No. 6,910,829, entitled IN SITU RETRIEVAL OF CONTAMINANTS OR OTHER SUBSTANCES USING A BARRIER SYSTEM AND LEACHING SOLUTIONS AND COMPONENTS, PROCESSES AND METHODS RELATING THERETO, the disclosure of which is incorporated in its entirety by reference herein.

GOVERNMENT RIGHTS

The United States Government has rights in the following invention pursuant to Contract No. DE-AC07-99ID13727 between the U.S. Department of Energy and Bechtel BWXT Idaho, LLC and Contract No. DE-AC07-05-ID14517 between the U.S. Department of Energy and Battelle Energy Alliance, LLC.

BACKGROUND OF THE INVENTION

1. Field of the Invention

The present invention relates to subterranean barriers for waste management formed by improved methods, apparatuses, and systems. Particularly, the present invention relates generally to methods, apparatus, and systems for joining adjacent casing sections positioned within respective subterranean boreholes. For example, the present invention relates to methods and apparatus for joining, via at least one weld, a plurality of casings to one another to form a substantially continuous barrier.

2. State of the Art

Containment, management, and disposal of various types of waste, such as chemical, nuclear, and other potentially harmful types of waste are recognized, longstanding problems. It is also well recognized that buried waste may often include heavy metals such as mercury or cadmium, carcinogenic materials such as trichloroethylene, radioactive materials, or other hazardous substances. Such hazardous materials within buried waste may be leached (i.e., carried from the waste within a liquid) therefrom, into surrounding soil and into the groundwater. Because water is used for human consumption and for agriculture, contamination of groundwater by leaching is a major concern.

However, the contamination caused by buried waste may not be limited solely to groundwater. For instance, contaminated groundwater may be carried into other waterways such as streams, rivers, and lakes, thus polluting those waterways and leading to poisoning of plant and animal life. In addition, polluted waterways pose a threat to humans as well, particularly in the case of waterways and bodies of water used for recreational purposes or as sources of drinking or irrigation water.

Also, while many of the problems associated with buried waste arise from the effect of leachate on water systems, buried waste may also emit gas phase contaminants that may cause deleterious effects if not contained and managed. For instance, such gas phase contaminants may pollute the soil and the groundwater, and may build up to unsafe concentrations or pressures, if contained, which could ultimately result in an explosion, or pollution of the atmosphere by venting of the gas.

Accordingly, a variety of methods and devices have been devised to attempt to resolve the problems related to buried waste. These remedies may be broadly grouped into the categories of remediation and containment. Generally, remediation focuses on processes designed to change the chemical composition of a contaminated material or contaminant to a more benign chemical composition, while containment remedies seek to isolate contaminants and contaminated material within an area or remove them from an area.

Remediation approaches such as biological treatments, thermal processes, and chemical processes may be problematic for a variety of reasons. In particular, many remediation techniques may be expensive and potentially hazardous. Further, it may be difficult to verify the effectiveness of many remediation treatments. Also, determining the proper or optimum remediation technique for a given contamination scenario may be, in itself, a complex and time-consuming process.

Containment, barrier, or in situ, approaches may be problematic as well. One known containment approach is simply to dig up and remove the contaminated soil for treatment or disposal. This approach is expensive and time-consuming and often accomplishes little more than moving the problem to another location. Of course, finding an acceptable ultimate disposal location is another significant impediment to movement of a contaminated region. Other containment approaches involve installing vertical barriers, horizontal barriers, or both types of barriers around the buried waste. In theory, this approach is attractive because it does not require digging up or otherwise disturbing the buried waste.

However, conventional containment or barrier systems suffer from a variety of inadequacies including a lack of durability, corrosion resistance, and structural integrity. These inadequacies are a function of numerous factors associated with the environment in which the containment or barrier systems are located including, but not limited to: exposure to harsh chemicals such as concentrated saline solutions, saturated calcite and gypsum solutions; exposure to extreme thermal gradients; and exposure to stresses induced by shifting in the earth within and adjacent the contaminated area. In addition, conventional barrier systems may suffer from inadequate ability to monitor or verify the integrity thereof as well as inadequate reparability thereof if a failure should occur.

Accordingly, recently, containment systems that are designed to contain, collect, or process effluent which would otherwise escape from a zone containing waste materials, have been developed. One such containment system is disclosed in U.S. Pat. No. 6,575,663 to Kostelnik, et al., assigned to the assignee of the present invention, the disclosure of which is incorporated in its entirety by reference herein. More particularly, U.S. Pat. No. 6,575,663 discloses a barrier comprising a series of adjacent casing strings that are interlocked with one another and may be filled with a barrier filling material to form a substantially continuous wall. Casing strings are disclosed as being disposed within the subterranean formation by way of so-called "microtunneling" techniques.

For instance, a barrier is first installed underneath the zone of interest. Specifically, a line of individual steel casing sections are placed by a micro-tunneling device or the like which simultaneously excavates a tunnel and installs connecting casing segments behind the micro-tunneling device as tunneling progresses. The length of the tunnels is determined by the size of the zone of interest to be contained. Preferably, the tunneling device includes a system for ensuring accurate placement and orientation of the tunnels and casing sections. As each tunnel is dug and lined with casing sections, a successive adjacent tunnel is dug and casing sections situated therein which longitudinally interlock with the casing sections placed in the previously excavated tunnel, so as to form a continuous barrier of predetermined width.

The casing sections, the joints whereby they interlock adjacent casing sections, or both may be filled with a filler, such as a grout or the like, for providing an added measure of strength, durability, and imperviousness to the barrier. In a preferred embodiment, two vertical barrier sections are interlocked with the ends of a horizontal barrier section so that the horizontal barrier and vertical barriers collectively form a continuous U or channel-shaped containment boundary extending around the zone of interest.

However, the integrity of such a barrier may, prematurely, fail due to repeated thermal stresses, or movement of the casing strings within the subterranean formation. For instance, filler within the casing sections may crack, or may otherwise become infirm.

In view of the foregoing problems and shortcomings with existing barrier apparatus, methods, and systems, it may be desirable to provide improved methods, apparatus, and systems in relation thereto. Also, it may be desirable to form barriers for waste management by such improved methods, apparatus, and systems.

BRIEF SUMMARY OF THE INVENTION

The present invention relates to barriers for waste management within a subterranean formation. Particularly, a subterranean barrier according to the present invention may comprise a plurality of casing strings positioned within a subterranean formation. Further, each of the plurality of casing strings may be laterally adjacent to at least one other casing string of the plurality of casing strings and at least one casing string of the plurality of casing strings may be affixed to at least another adjacent casing string of the plurality of casing strings through at least one weld. Alternatively, at least one casing string of the plurality of casing strings may be affixed to at least another adjacent casing string of the plurality of casing strings through at least one adhesive joint. Optionally, at least one casing string of the plurality of casing strings may be affixed to at least another adjacent casing string of the plurality of casing strings through both at least one weld and at least one adhesive joint.

The at least one casing string of the plurality of casing strings and the at least another adjacent casing string may be directly welded to one another or may be indirectly affixed to one another through at least one weld. For instance, the at least one casing string of the plurality of casing strings and the at least another adjacent casing string may each be welded to at least one closure element.

In one embodiment, an interlocking structure extending between the at least one casing string of the plurality of casing strings and the at least another adjacent casing string of the plurality of casing strings may comprise a male interlocking structure and a female interlocking structure at least partially cooperatively engaged with one another. Further, the at least one weld may be formed between the male interlocking structure and the female interlocking structure, directly or through at least one closure element.

In a method of forming a barrier adjacent a selected region of a subterranean formation according to the present invention, a plurality of casing strings may be placed within a subterranean formation so that each of the plurality of casing strings is laterally adjacent to at least one other casing string of the plurality of casing strings. Additionally, at least two laterally adjacent casing strings of the plurality of casing strings may be affixed to one another by forming at least one weld.

Of course, at least two laterally adjacent casing strings of the plurality of casing strings may be directly welded to one another or may be indirectly affixed to one another through at least one weld. For instance, the at least two laterally adjacent casing strings of the plurality of casing strings may each be welded to at least one closure element.

The present invention also relates to a method of selectively heating at least one casing string forming at least a portion of a barrier within a subterranean formation comprising a plurality of casing strings, wherein each of the plurality of casing strings is laterally adjacent to at least one other casing string of the plurality of casing strings. Particularly, a heating apparatus may be positioned within a bore of a casing string forming at least a portion of a barrier adjacent a selected region of a subterranean formation and a portion of the casing string may be selectively heated by operating the heat delivery device.

Another aspect of the present invention relates to a method of inspecting a barrier within a subterranean formation comprising a plurality of casing strings wherein each of the plurality of casing strings may be laterally adjacent to at least one other casing string of the plurality of casing strings. Particularly, a radiographic signal may be emitted from within at least one of the plurality of casing strings toward an adjacent casing string of the plurality of casing strings and the radiographic signal may be detected from within the adjacent casing string of the plurality of casing strings.

Also, the present invention relates to a system for inspecting a barrier within a subterranean formation comprising a plurality of casing strings, wherein each of the plurality of casing strings is laterally adjacent to at least one other casing string of the plurality of casing strings. Specifically, the system may include a radiographic source configured for emitting a radiographic signal from within at least one of the plurality of casing strings toward an adjacent casing string of the plurality of casing strings. Further, the system may include a radiographic detector configured for detecting the radiographic signal from within the adjacent casing string of the plurality of casing strings.

Additionally, the present invention relates to a method of repairing a barrier within a subterranean formation comprising a plurality of casing strings, wherein each of the plurality of casing strings is laterally adjacent to at least one other casing string of the plurality of casing strings. For instance, at least a portion of a casing string of the plurality of casing strings may be removed and a repair element may be welded within the casing string.

In yet a further aspect of the present invention, at least one casing string of the plurality of casing strings and the at least another adjacent casing string may be directly adhesively joined to one another or may be indirectly affixed to one another through at least one adhesive joint. For instance, the at least one casing string of the plurality of casing strings and the at least another adjacent casing string may each be adhesively joined to at least one closure element.

In one embodiment, an interlocking structure extending between the at least one casing string of the plurality of casing strings and the at least another adjacent casing string of the plurality of casing strings may comprise a male interlocking structure and a female interlocking structure at least partially cooperatively engaged with one another. Further, the at least one adhesive joint may be formed between the male interlocking structure and the female interlocking structure, directly or through at least one closure element.

In a method of forming a barrier adjacent a selected region of a subterranean formation according to the present invention, a plurality of casing strings may be placed within a subterranean formation so that each of the plurality of casing strings is laterally adjacent to at least one other casing string of the plurality of casing strings. Additionally, at least two laterally adjacent casing strings of the plurality of casing strings may be affixed to one another by forming at least one adhesive joint.

Of course, at least two laterally adjacent casing strings of the plurality of casing strings may be directly welded to one another or may be indirectly affixed to one another through at least one adhesive joint. For instance, the at least two laterally adjacent casing strings of the plurality of casing strings may each be adhesive joined to at least one closure element.

Further, the present invention contemplates that a subterranean barrier adjacent a selected region of a subterranean formation may comprise a plurality of casing strings positioned within a subterranean formation, wherein at least two of the plurality of casing strings are structured and positioned with respect to one another for forming at least one of at least one adhesive joint and at least one weld therebetween.

BRIEF DESCRIPTION OF THE DRAWINGS

While the specification concludes with claims particularly pointing out and distinctly claiming that which is regarded as the present invention, the advantages of the present invention can be more readily ascertained from the following description of the invention when read in conjunction with the accompanying drawings in which:

DETAILED DESCRIPTION OF THE INVENTION

The present invention relates to forming subterranean barriers for waste management by improved methods, apparatuses, and systems, wherein the subterranean barrier comprises a plurality of adjacent, tubular casing strings. More particularly, the present invention relates to joining at least two adjacent tubular casing strings to one another, by way of at least one weld, to form a barrier containment system.

Figure 1:
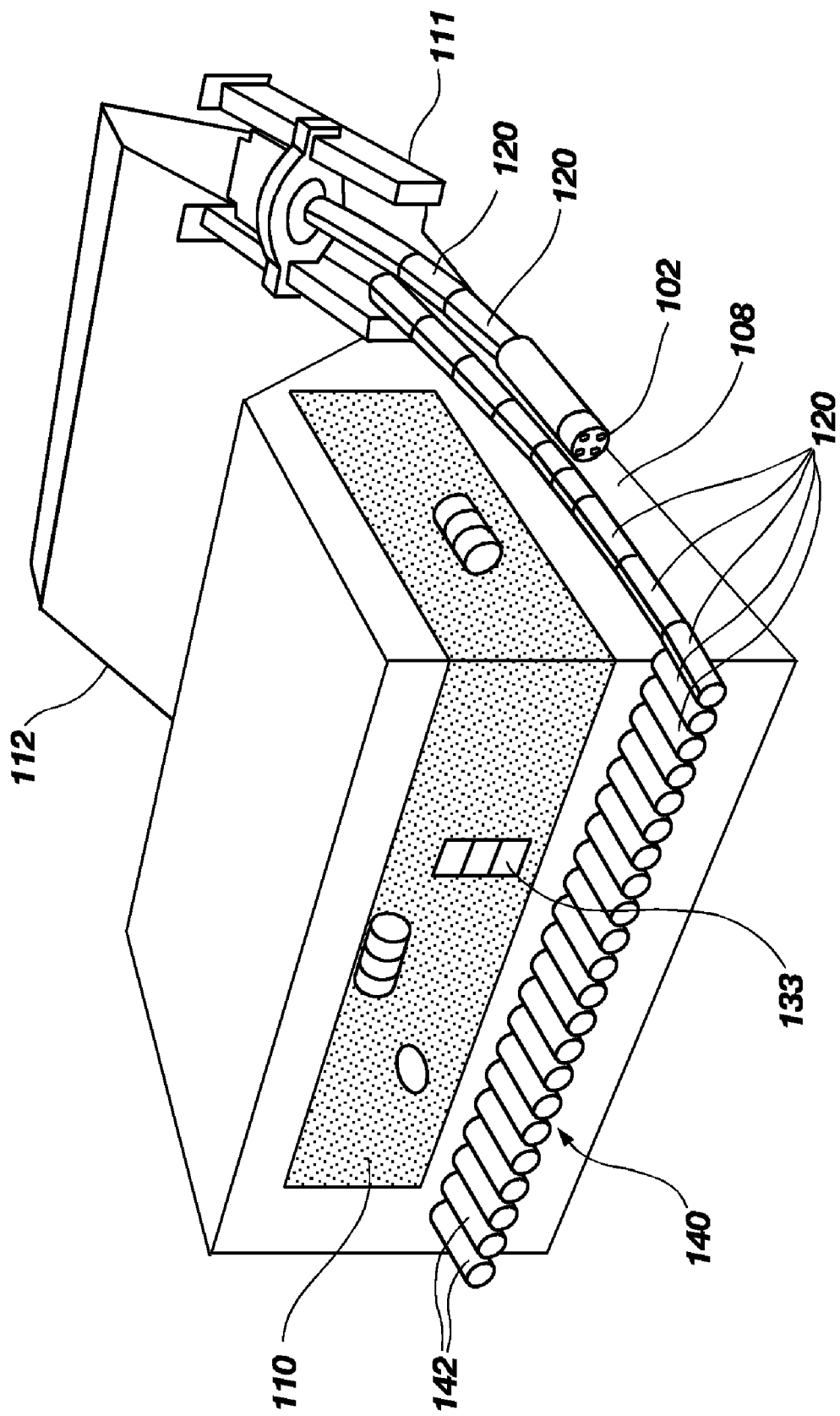
FIG. 1 shows a perspective cut-away view of a subterranean barrier of the present invention.

FIG. 1 shows a perspective cut-away view of a subterranean barrier 140 according to the present invention, which may be formed by the methods of the present invention. Particularly, subterranean barrier 140 may comprise a plurality of adjacent casing strings 142 including at least one weld adjoining at least two of the plurality of casing strings 142 to one another. Subsurface region 110 may include buried waste 133, as shown in FIG. 1, or another material or concern that renders subterranean barrier 140 desirable or necessary. Thus, subterranean barrier 140 may be formed generally underneath subsurface region 110 and for substantially containing, treating, monitoring, or otherwise interacting therewith.

As shown in FIG. 1, a pipe jacking apparatus 111 and microtunneling machine 102 may be employed to form a plurality of adjacent casing-lined tunnels generally surrounding and underneath a subsurface region 110. Particularly, casing strings 142 may comprise a plurality of casing sections 120 affixed to one another and extending longitudinally (lengthwise) in an end-to-end relationship and may be disposed within subterranean formation 108, as by tunneling or drilling methods and apparatus as known in the art. Particularly, casing strings 142 may comprise a plurality of casing sections 120 affixed to one another in an end-to-end relationship, as by threaded surfaces, welding, or both. Further, each of casing strings 142 may be positioned within each of tunnels either substantially contemporaneously as tunneling progresses with microtunneling machine 102, or subsequent to forming a tunnel, so as to form a lined, tubular structure inside each tunnel.

Thus, microtunneling machine 102 may be employed to form a plurality of adjacent casing-lined tunnels underneath a subsurface region 110. In one embodiment, each tunnel may be substantially circular in cross section. However, this invention contemplates that each tunnel may exhibit any of a wide variety of different cross-sectional shapes (e.g., rectangular, triangular, I-beam shaped, etc.). As shown in FIG. 1, each tunnel begins in trench 112 and ends in a trench (not shown) on the other side of subsurface region 110. Similarly, each casing string 142 may exhibit any of a wide variety of different cross-sectional shapes (e.g., substantially circular, substantially rectangular, substantially triangular, I-beam shaped, etc.). Also, casing sections 120 may comprise a metal, such as steel (e.g., carbon steel or stainless steel), aluminum, or the like. However, any alternative materials that provide sufficient functionality and durability are encompassed within the present invention. Alternative exemplary casing materials include, but are not limited to, a polymer, such as PVC, HDPE, polypropylene, or PVDF, vitrified clay, concrete or cement, fiberglass, or other suitable materials as known in the art.

Further, optionally, the casings strings 142 disposed within the adjacent tunnels may be interlocked to form a subsurface subterranean barrier 140. More specifically, as adjacent tunnels may be formed and lined with casing strings 142, each including a plurality of casing sections 120, wherein each casing section 120 of a casing string 142 installed within a tunnel may be interlocked with, along a side wall thereof, an adjacent casing section 120 of an adjacent casing string 142 disposed within an adjacent tunnel so that a substantially continuous subterranean barrier 140 may be formed. Accordingly, each of casing sections 120 may be interlocked with at least one other adjacent casing section 120 through complementary interlocking structures.

Figure 2:
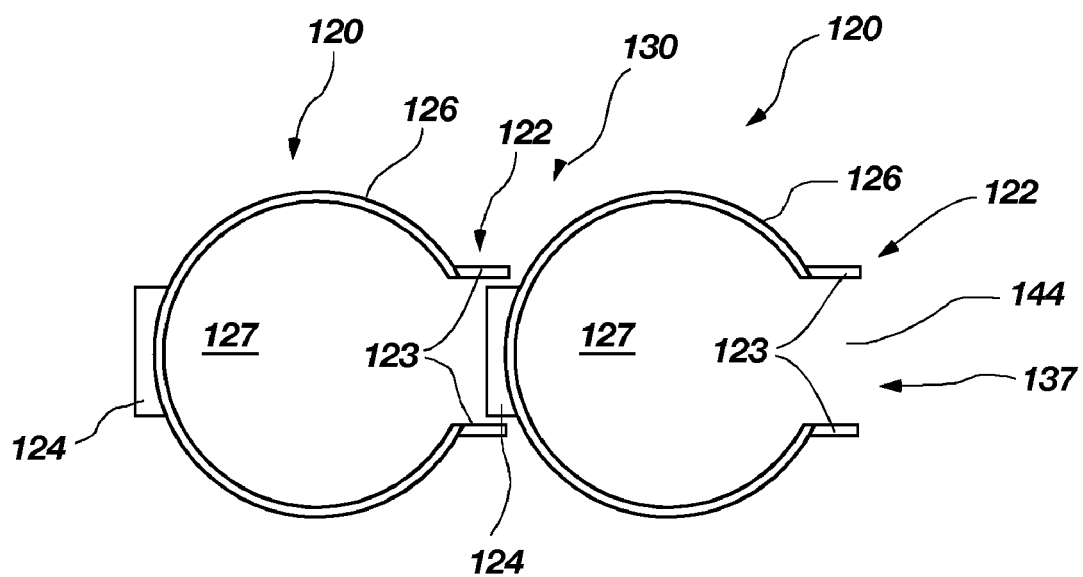
FIG. 2 shows a cross-sectional view of two interlocked, adjacent casing sections that may form a portion of the subterranean barrier shown in FIG. 1.

More specifically, FIG. 2 shows a partial cross-sectional view of one exemplary embodiment of two adjacent casing sections 120 that may form a portion of subterranean barrier 140, the two adjacent casing sections 120 interlocked with one another by way of interlocking structure 130. Interlocking structure 130, as shown in FIG. 2 includes a male interlocking structure 124 and a female interlocking structure 122. More generally, however, each of casing sections 120 may include at least one male interlocking structure 124, at least one female interlocking structure 122, or combinations thereof, without limitation. Each casing section 120, as shown in FIG. 2, comprises a tubular body 126 forming a bore 127. For simplicity, bore 127, as used herein, may refer to the bore of a casing section 120 or may refer to the bore of a casing string 142 that is formed by a plurality of casing sections 120 affixed to one another in an end-to-end relationship. As mentioned above, each of casing sections 120 may comprise different, noncircular tubular cross-sectional shapes, as known in the art.

Each female interlocking structure 122 may include guide features 123 that form an opening 137 that extends longitudinally along bore 127 of tubular body 126. Thus, opening 137 may extend substantially along the entire length of casing section 120. Optionally, a frangible protective element 144 may be initially disposed across the opening 137 formed between the circumferentially adjacent portions of guide features 123. Of course, disposing a male interlocking structure 124 within a female interlocking structure 122, as shown in FIG. 2, may perforate the frangible protective element 144 associated therewith as the leading end of the male interlocking structure 124 proceeds longitudinally (i.e., along the length of casing section 120) within the female interlocking structure 122 of an adjacent casing string 142 (FIG. 1), according to the drilling or tunneling process for forming casing-lined tunnels mentioned above.

Generally, according to the present invention, at least two of the casing strings 142 comprising subterranean barrier 140 may be affixed to one another subsequent to placement within a subterranean formation, through at least one welded joint. As discussed hereinbelow, at least two casing strings 142 may be welded directly to one another or may each be welded to a common element or member so as to affix or join the at least two casing strings 142 to one another. Accordingly, the at least two casing strings 142 may be structured for forming at least one weld therebetween.

Figure 3A:
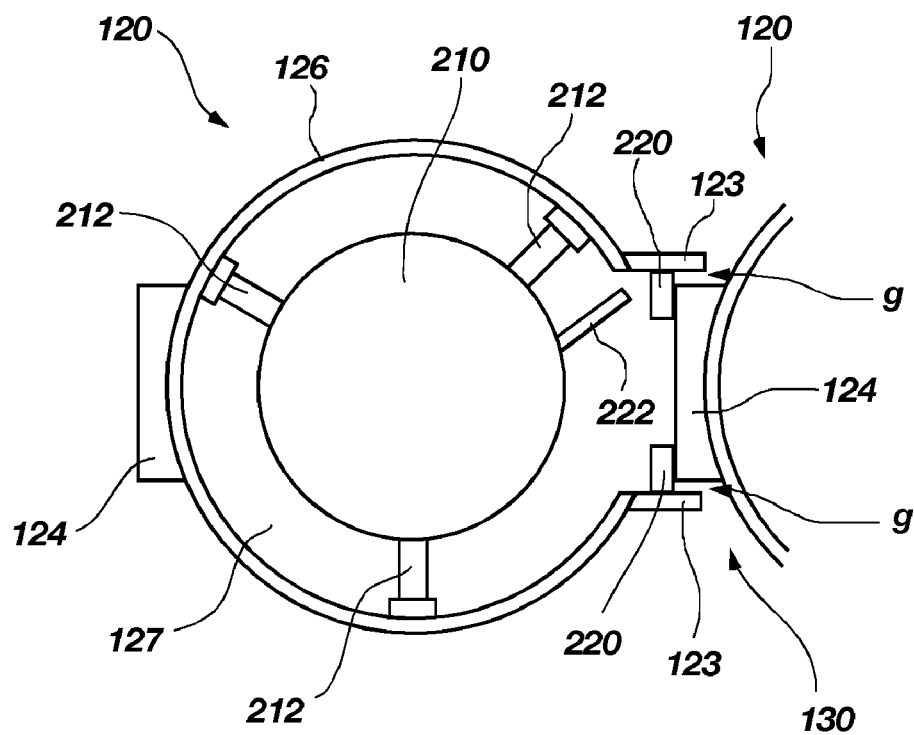
FIG. 3A shows an enlarged partial cross-sectional view of the interlocking structure shown in FIG. 2, including a welding apparatus including a single welding head positioned within a bore of one of the casing sections.

Accordingly, a welding process according to the present invention will be described with reference to FIGS. 3A-3C. Particularly, FIG. 3A shows a partial side cross-sectional view of two casing sections 120 of respective, adjacent, interlocked casing strings 142, as shown in FIG. 2, including welding apparatus 210 positioned within bore 127 of one casing section 120 by positioning legs 212. Positioning legs 212 may include one or more wheels and may be biased by way of a biasing element (not shown) configured for positioning welding apparatus 210 within a bore of a substantially tubular structure, such as the (substantially circular) bore 127 of casing section 120. Also, welding apparatus 210 may be movable along the length of a casing string 142, within a bore 127 of one of the plurality of casing sections 120 comprising same. Of course, welding apparatus 210 may be configured for performing welding processes within a bore 127 of each of casing strings 142.

"Weld," as used herein, means to unite or join two articles by causing at least a portion of the articles to at least partially flow together. Explaining further, welding apparatus 210 may be suited (i.e., sized, configured, and structured) for selectively delivering sufficient heat, energy, materials, solvents, or combinations thereof to a desired region for forming a weld between two adjacent casing strings 142. Generally, welding apparatus 210 may be configured for performing any welding operation as known in the art, without limitation. For example, and not by way of limitation, welding apparatus may be suited for performing gas welding, arc welding, gas-shielded arc welding, oxyfuel welding (e.g., acetylene, oxyacetylene, or oxyhydrogen), laser welding, induction welding, electron beam welding, chemical welding (also known as "solvent welding"), ultrasonic welding, resistance welding, or combinations thereof. Therefore, generally, a weld formed via welding apparatus 210 may comprise at least one of a heat-induced weld, a chemical weld, and an ultrasonic weld, or another weld as known in the art, without limitation.

Accordingly, by way of further example, welding apparatus 210 may comprise a welding apparatus for forming an internal weld within a pipeline as disclosed by, for example, any of U.S. Pat. No. 3,424,887 to Fehlman, U.S. Pat. No. 5,435,478 to Wood et al., U.S. Pat. No. 5,601,225 to Wood et al., U.S. Pat. No. 3,582,599 to Yohn, and U.S. Pat. No. 5,593,605 to Jones. Optionally, since both ends of a casing string 142 may be accessible, a cable may be affixed to the welding apparatus 210 and the welding apparatus may be pulled through a casing string 142. Such a configuration may simplify the design of welding apparatus 210.

Thus, at least one welding head 222 may be affixed to welding apparatus 210 and configured for movement within a bore 127 of casing section 120, so as to be selectively positionable for forming a weld upon a desired portion of an interior of a casing section 120. Thus, welds W, as shown in FIG. 3C, may be formed by a welding apparatus 210 including a single welding head 222, as shown in FIG. 3A, configured for forming at least one weld within casing section 120 of casing string 142. Welding head 222 may be at least sufficiently positionable within bore 127 for forming each of welds W as shown in FIG. 3C. Thus, in one contemplated configuration, each of welds W shown in FIG. 3C may be formed sequentially, by positioning welding head 222 proximate a desired region of the side cross-sectional region of a casing section 120 and operating welding head 222 while moving welding head 222 longitudinally within the bore 127 of casing section 120. Of course, welding head 222 may be configured in relation to the type of welding technology employed by welding apparatus 210. For example, if welding apparatus 210 comprises a laser welding apparatus, welding head 222 may comprise a mirror for directing a laser beam toward a region desired to be welded.

Thus, as shown in FIG. 3A and described above, a welding apparatus 210 may be provided within a bore 127 of a casing section 120 and configured for traveling along the longitudinal length of at least one casing string 142 and for forming a welded joint affixing a casing string 142 and at least one adjacent casing string 142 to one another, at least along a portion of the respective, adjacent longitudinal lengths thereof. Of course, considering a subterranean barrier 140 as shown in FIG. 1, each of the plurality of casing strings 142 may be welded along substantially the entire length thereof to each casing string 142 adjacent thereto so that the entire subterranean barrier 140 is formed of a plurality of casing strings 142 affixed to one another, respectively, through at least one welded joint.

Also, optionally, it may be preferable to seal or at least partially isolate a region of a casing string 142 within which a welding apparatus 210 is operating (e.g., wherein a weld is being formed) so as to enhance the formation of at least one formed therewith. Accordingly, welding apparatus 210 may include both sealing elements (not shown) as well as a gas delivery system (not shown) for performing welding in a suitable, controlled atmosphere within a selected region of bore 127 of casing string 142. For instance, gas-shielded welding operations may be performed within an at least partially isolated longitudinal region of a casing string 142 flooded by a selected gas. Therefore, sealing elements (not shown) may be provided for at least partially isolating a longitudinal region of casing string 142 and gas may be communicated or delivered to the at least partially isolated longitudinal region of the casing string 142. However, it may be desired that sealing elements do not contact, but only closely mimic or emulate, the interior of casing string 142 because welding apparatus 210 may preferably move easily within casing string 142.

As mentioned above and as shown in FIG. 3A, casing sections 120 forming casing strings 142 disposed within the adjacent tunnels may be interlocked, by way of complementarily-shaped interlocking structures, (e.g., male and female) along a side thereof, to form a substantially continuous subsurface subterranean barrier 140. Generally, ample clearance may be provided between complementarily-shaped interlocking structures of adjacent casing strings 142 to allow for ease in installation, particularly where casing strings 142 may exhibit curvature along their length. Therefore, generally, gaps or clearance may exist within interlocking structure 130 formed between adjacent, interlocked casing sections. Particularly, as shown in FIG. 3A, female interlocking structure 122 may comprise an opening 137 formed between guide features 123. Further, a distance between guide features 123 may exceed the size of male interlocking structure 124; therefore, gaps, labeled "g" may be formed longitudinally along the length of casing strings 142, between the male interlocking structure 124 and each of guide features 123, respectively.

According to one aspect of the present invention, at least one gap formed between interlocking structures of two adjacent casing strings may be substantially or completely closed or sealed by forming at least one weld. For instance, in one embodiment, as shown in FIG. 3A, closure elements 220 may be placed adjacent guide features 123 and male interlocking structure 124, respectively. Closure elements 220 may be configured for substantially or completely closing, collectively and upon welding of each closure element 220 to a respective guide feature 123 and a respective portion of male interlocking structure 124, gaps g formed between the female interlocking structure 122 and the male interlocking structure 124. Put another way, since clearance between male interlocking structure 124 and guide features 123 may be desirable for assembling adjacent casing strings 142 to one another, a closure element 220 may be configured for matingly engaging both a guide feature 123 and a male interlocking structure 124 so as to substantially or completely close the clearance or gap upon welding of the closure element 220 to both the male interlocking structure 124 and a guide feature 123. Welding apparatus 210 may be configured for positioning closure elements 220 in a desired position for welding, as shown in FIG. 3A. In one embodiment, closure elements 220 may comprise a so-called "bar stock," comprising, for instance, steel, aluminum, a polymer, or another material compatible for welding to male interlocking structure 124 and guide feature 123, and may exhibit a cross-sectional shape that is suitable for matingly engaging, if properly positioned, both a guide feature 123 and the male interlocking structure 124. Accordingly, closure elements 220 may comprise a polymer such as PVC, HDPE, polypropylene, PVDF, or the like.

Thus, in one embodiment, closure elements 220 may each comprise a substantially continuous elongated body having a sufficient length to extend longitudinally through the entire bore 127 of a casing string 142 of a barrier. Further, although closure elements 220 are shown in FIG. 3A as comprising substantially rectangular cross-sectional shapes, the present invention is not so limited. Rather, closure elements 220 may comprise substantially circular, triangular, rectangular, or shapes as otherwise known in the art.

Figure 3B:
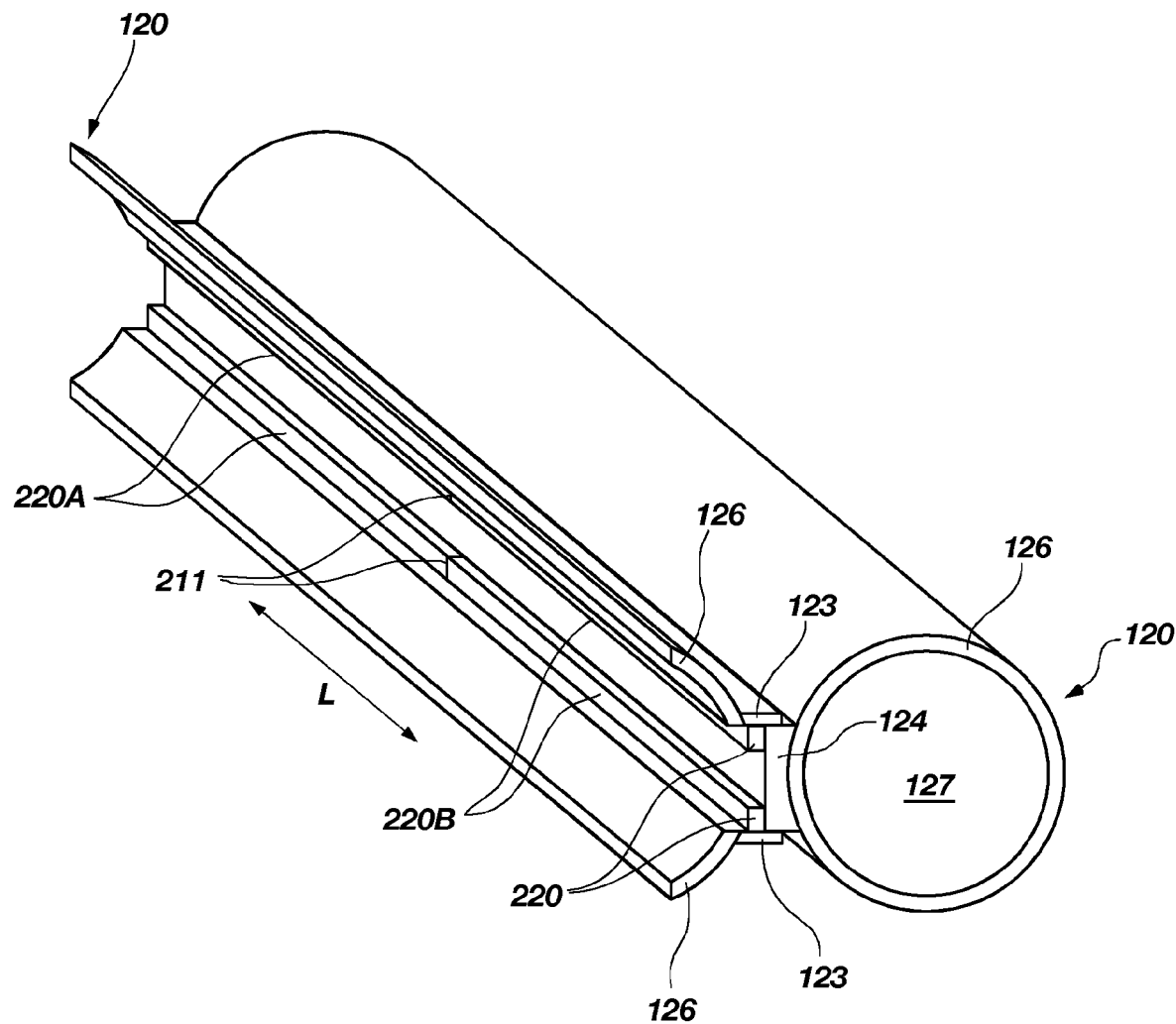
FIG. 3B shows a perspective view of a sectioned casing section interlocked with an adjacent casing section, as shown in FIG. 2.

FIG. 3B shows a perspective view of a sectioned casing section 120 interlocked with an adjacent casing section 120. As shown in FIG. 3B, closure elements 220 may each comprise a plurality of closure element sections 220A and 220B that may abut one another in an end to end relationship at joints 211, respectively. Each of joints 211 may be welded via welding apparatus 210 (FIG. 3A), to form an elongated body extending generally parallel to longitudinal axis L. For instance, a plurality of closure element sections 220A and 220B may be assembled prior to placement within a bore 127 of each casing section 120 of a casing string 142. Alternatively, assembly of a plurality of closure elements 220 to form an elongated body may occur within the casing string 142. Further, closure elements 220 may be welded to one another in an end to end relationship so as to form an elongated body extending longitudinally along the entire bore 127 of a casing string 142.

Figure 3C:
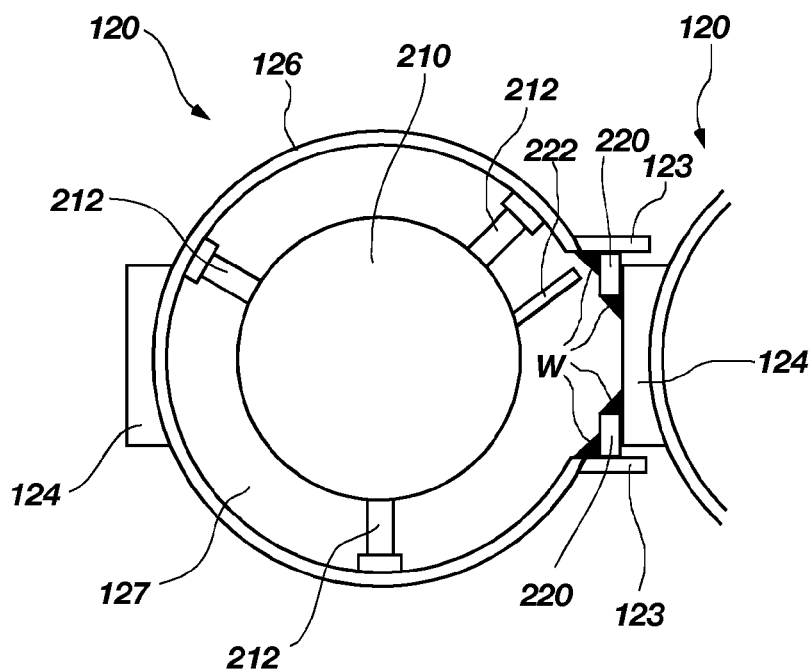
FIG. 3C shows an enlarged partial cross-sectional view of the interlocking structure shown in FIG. 3A, including welds formed therein.

Further, as shown in FIG. 3C, welds W may be formed along each of closure elements 220, affixing each of closure elements 220 to a respective guide feature 123 and a respective male interlocking structure 124. Welds W may extend substantially continuously along the longitudinal extent of each of closure elements 220. Thus, at least two casing strings 142 may be adjoined or affixed to one another through at least one weld or, as shown in FIG. 3C a plurality of welds W. Further, formation of welds W may substantially seal the interior of bore 127 of a casing section 120. Also, forming welds W along substantially the entire longitudinal length of a plurality of casing sections 120 comprising a casing string 142 may substantially seal the interior bore 127 thereof. Such a configuration may be desirable for preventing leaks through a subterranean barrier 140 including a plurality of casing strings 142 so configured.

Figure 3D:
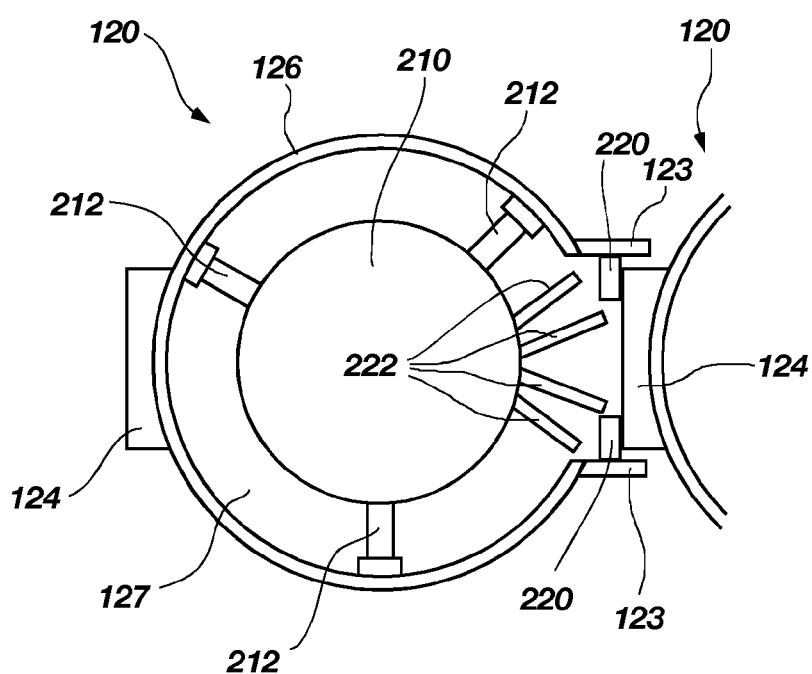
FIG. 3D shows an enlarged partial cross-sectional view of the interlocking structure shown in FIG. 2, including a welding apparatus including a plurality of welding heads positioned within a bore of one of the casing sections.

Alternatively, welding apparatus 210 may comprise a plurality of welding heads 222, as shown in FIG. 3D. Thus, welds W, as shown in FIG. 3B, may be formed by a plurality of welding heads 222 each configured for forming a weld within casing section 120 of casing string 142. Welding heads 222 may be sufficiently positionable within bore 127, individually or collectively, for forming each of welds W as shown in FIG. 3B. Thus, in one contemplated configuration, each of welds W shown in FIG. 3B may be formed substantially simultaneously, by positioning each of the plurality of welding heads 222 proximate a desired region of the side cross-sectional region of a casing section 120 and operating the plurality of welding heads 222 while moving same longitudinally within the bore 127 of casing section 120. Such a configuration may provide a relatively fast and efficient process for forming welds W.

Figure 4A:
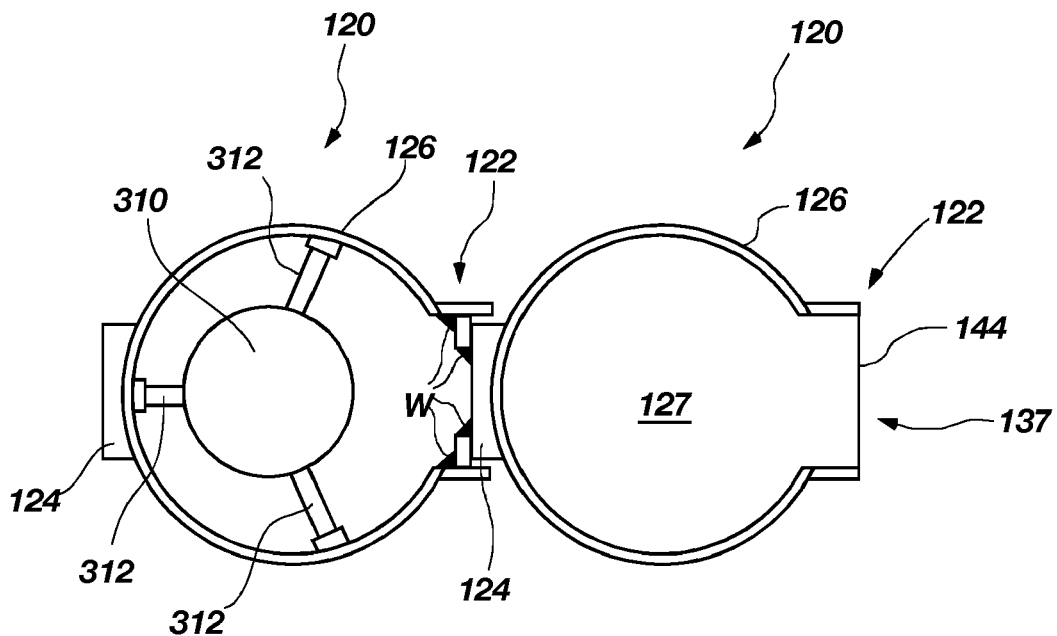
FIG. 4A shows an enlarged partial cross-sectional view of the interlocking structure shown in FIG. 2, including a NDT apparatus positioned within a bore of one of the casing sections.

In a further aspect of the present invention, nondestructive inspection or verification of at least a portion of the at least one weld formed for adjoining two adjacent casing strings 142 may be performed. Many different types of so-called non-destructive testing (NDT) or evaluation techniques for inspection or verification of welds are known in the art. For instance, visual (e.g., dye penetrant), ultrasonic, magnetic particle inspection, radiography, (e.g., x-ray or gamma ray), eddy current, or combinations thereof may be employed for verification of at least a portion of at least one weld formed for joining adjacent casing strings 142 to one another. More specifically, as shown in FIG. 4A, a NDT apparatus 310 for performing NDT of at least one weld formed between two casing strings 142 may be disposed within one of casing strings 142 and operated to perform verification of at least one characteristic or quality of the at least one weld formed therebetween. As shown in FIG. 4A, NDT apparatus 310 may be positioned within a bore 127 of a casing string 142 by way of positioning legs 312 and may be configured for interaction with the welds W formed therein. For instance, NDT apparatus 310 may include a dye penetrant application system and a camera or other visual inspection device for performing dye penetrant and visual inspection of at least one of welds W. Of course, data (e.g., images, radiographic detection, etc.) collected or otherwise sensed by way of NDT apparatus 310 may be transmitted therefrom and outside of a casing string through wires, radio signal, or other communication technology as known in the art.

Figure 4B:
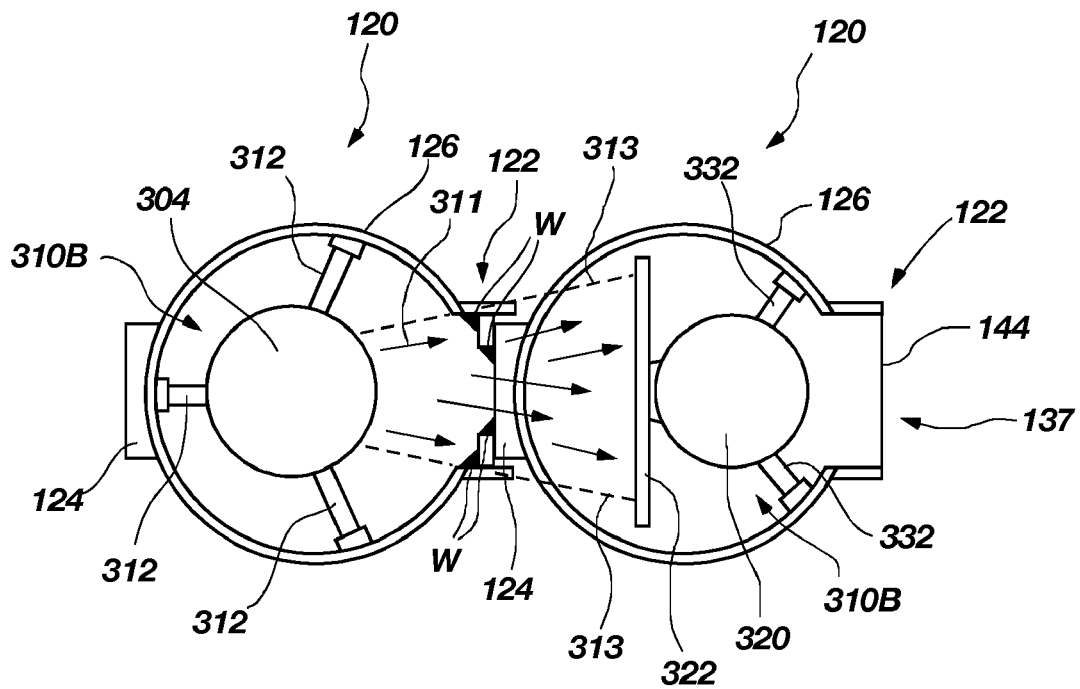
FIG. 4B shows an enlarged partial cross-sectional view of the interlocking structure shown in FIG. 2, including a NDT apparatus including a radiographic source positioned within a bore of one of the casing sections and a detection device positioned in a bore of the other of the casing sections.

In another embodiment of a NDT apparatus 310B, as shown in FIG. 4B, since an adjacent casing string 142 may be available for use in inspecting at least one weld formed between two casing strings 142, a NDT apparatus 310B which emits a radiographic signal (e.g., x-rays, gamma rays, etc.) that is transmitted through at least one of welds W and toward an adjacent casing string 142 may be particularly advantageous. As shown in FIG. 4B, a NDT apparatus 310B according to the present invention is shown including a radiographic source 304, such as an x-ray tube, positioned within bore 127 of casing section 120 and configured for emitting a radiographic signal 311 toward adjacent casing section 120, as shown in FIG. 4B generally within reference lines 313. Further, NDT apparatus 310B includes a detection device 320 including a detector 322 (e.g., a fluoroscopic screen or film) may be positioned within the adjacent casing section 120 for detecting the radiographic signal 311 emitted from radiographic source 304. Detection device 320 may be positioned within bore 127 of casing section 120 by way of positioning legs 332 and other positioning members (not shown) for preventing detector 322 from contacting tubular body 126 of casing section 120. Of course, the radiographic source 304 and the detection device 320 may be configured for coordinated movement or positioning with respect to one another while positioned within different casing strings 142, respectively.

Verifying at least one characteristic or quality of at least a portion of at least one weld formed by welding apparatus 210 may be performed by NDT apparatus following in the direction in which at least one is being formed, proximate thereto, or, alternatively, a NDT apparatus may be placed within a bore 127 of a casing string 142 subsequent to completion of a welding process therein. Accordingly, in one example, at least one characteristic of at least a portion of at least one weld formed by welding apparatus 210 may be verified as the welding apparatus 210 continues to form the at least one weld. Alternatively, at least a portion of at least one weld may be formed subsequent to the welding apparatus 210 forming a desired portion or an entire length of at least one weld.

Upon detection of an anomaly within a portion of a weld, repair thereof may be performed. Welding apparatus 210 may be configured for repairing a portion of a weld that is indicated as requiring or otherwise may be designated for repair. For instance, removal of a portion of the weld via grinding, cutting, or machining, as well as subsequent additional welding, or both may be performed by welding apparatus 210 for repairing a flaw or anomaly that is detected in a weld or a portion of a weld that may be selected for repair.

In yet a further aspect of the present invention, subsequent to welding an interlocking structure of a casing string 142 to form an at least substantially closed or sealed elongated bore 127 extending therein, the free ends of the casing string 142 may be sealed, as by welding a cap thereon, respectively and the interior of the casing string 142 may be pressurized with a gas through a port installed for communication therewith. Further, the pressure developed within the interior of the casing string 142 may be monitored (e.g., via at least one pressure transducer), for verifying that the interior of the casing string is hermetically sealed. Such a configuration may provide a relatively simple and robust indication of integrity of a casing string 142 and, overall, of a barrier formed therewith.

It is further contemplated by the present invention that at least a portion of a casing string 142 may be removed from a subterranean barrier 140 and repaired or replaced. For instance, welding apparatus 210 may be capable of removing a portion of casing section 120 (i.e., grinding, cutting, or machining so as to form pieces thereof that may be removable from within a bore of the casing string). Thus, at least a portion of a casing section 120 may be repaired by cutting and removing a selected portion thereof, positioning a replacement or repair element therein, and welding the repair element into the existing casing string 142 by way of a welding apparatus 210 as described above.

As may be readily appreciated by one of ordinary skill in the art, casing sections 120 may be structured in various, different embodiments. For example, and not by way of limitation, casing sections 120 may comprise interlocking structures as described in U.S. Pat. No. 6,758,634 to Nickelson and U.S. patent application Ser. No. 10/358,633 to Nickelson, each of which is assigned to the assignee of the present invention and the disclosures of each of which are incorporated in their entirety by reference herein. Further, casing sections may be structured for facilitating forming of at least one weld therebetween or for improving or simplifying a welding process related to forming at least one weld therebetween.

Figure 5A:
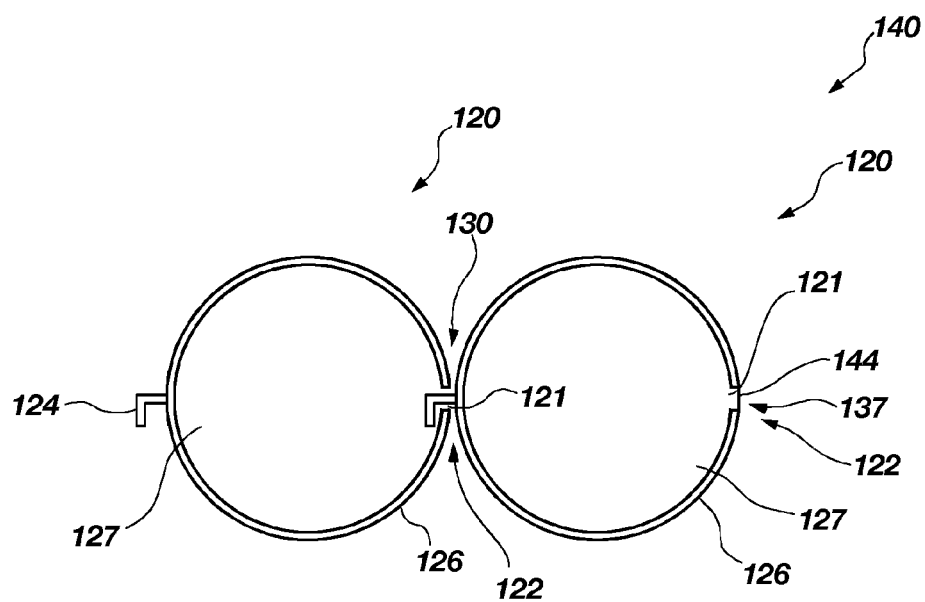
FIG. 5A shows a partial cross-sectional view of two adjacent, interlocked casing strings which may form a portion of a subterranean barrier according to the present invention.
Figure 5B:
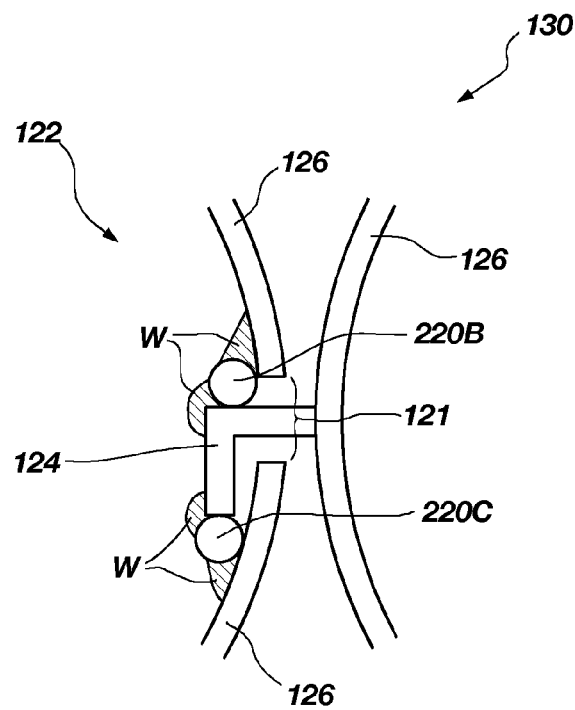
FIG. 5B shows an enlarged partial cross-sectional view of the interlocking structure as shown in FIG. 5A, including welds formed therein.

More specifically, in one exemplary embodiment, FIGS. 5A and 5B show a side cross-sectional view and an enlarged partial side cross-sectional view of interlocking structure 130, respectively. More specifically, interlocking structure 130 may comprise a male interlocking structure 124 configured as a generally L-shaped outwardly extending feature, relative to the tubular body 126 of casing section 120, disposed within an associated female interlocking structure 122. It may be noted that the at least one female interlocking structure 122 may comprise a recess 121 opening into the bore 127 of a casing section 120 and a frangible protective element 144 may be provided on the outer radial surface of its tubular body 126 for preventing contaminants from entering bore 127. For instance, frangible protective element 144 may comprise a plastic sheet material that is wound circumferentially about the casing section 120.

According to the present invention, at least one weld may be formed for joining male interlocking structure 124 to female interlocking structure 122. Thus, FIG. 5B shows an enlarged side cross-sectional view of interlocking structure 130, including substantially cylindrical, differently sized, substantially circular closure element sections 220B and 220C and welds W. More specifically, two of welds W are formed between the male interlocking structure 124 and both closure element sections 220B and 220C, respectively. Further, two of welds W are formed between closure element sections 220B and 220C. Thus, male interlocking structure 124 may be described as being indirectly affixed or joined to female interlocking structure 122 through substantially circular closure element sections 220B and 220C.

Figure 6:
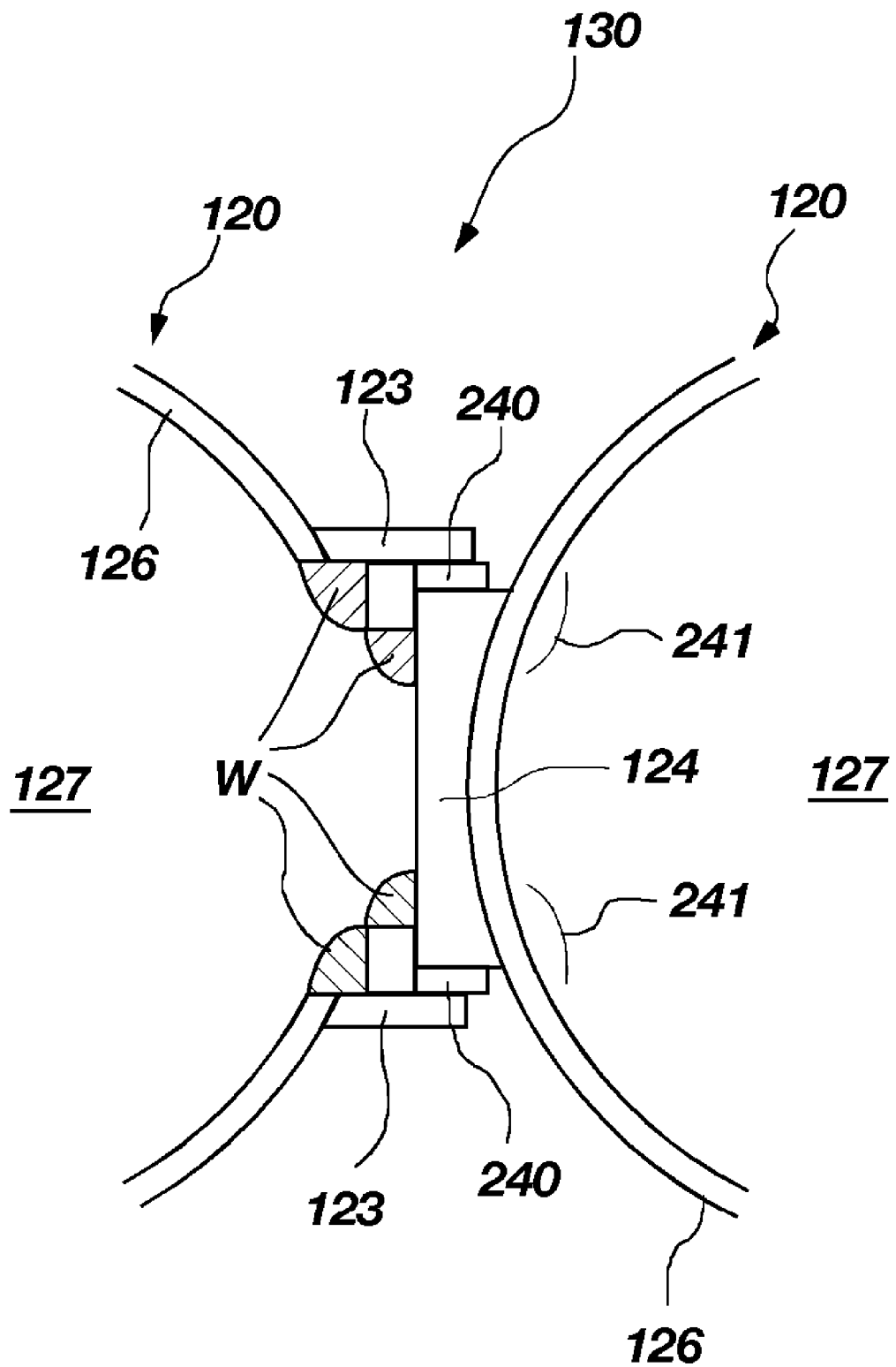
FIG. 6 shows an enlarged partial cross-sectional view of the interlocking structure as shown in FIG. 4A, including sealing elements positioned between the male interlocking structure and the female interlocking structure.

As a further consideration, an interlocking structure of the present invention may include at least one sealing element. Further, forming at least one weld for adjoining respective portions of an interlocking structure may cause at least partial melting of the at least one sealing element. Such a configuration may provide increased resistance to leakage through the interlocking structure. For example, FIG. 6 shows an enlarged side cross-sectional view of the interlocking structure 130, as shown in FIG. 3C, but also including elongated sealing elements 240, extending longitudinally along the length of guide features 123, between guide features 123 and male interlocking structure 124. Sealing elements 240 may comprise a polymer, such as a plastic (e.g., nylon, polyethylene, etc.). Sealing elements 240 may be structured for reducing the overall (i.e., along the length) amount of clearance between male interlocking structure 124 and female interlocking structure 122. However, sealing elements 240 may, under the forces and contact between male interlocking structure 124 and female interlocking structure 122, be configured for abrading, deforming, or otherwise accommodating assembly thereof. Thus, upon assembly of an entire casing string 142 adjacent and interlocked with another casing string 142, some regions of sealing elements 240 may be deformed or abraded away, while other regions may be as shown in FIG. 6.

Further, in another aspect of the present invention, forming welds W as shown in FIG. 6 may provide sufficient heat to at least partially melt sealing elements 240. As used herein, "melt" refers to heating a material such that a glass transition temperature of the material is exceeded. Thus, sealing elements 240 may be sized, configured, or structured for at least partially melting in response to forming at least one weld proximate thereto. Alternatively, an area proximate each of sealing elements 240 may be heated so as to at least partially melt each of sealing elements 240. For example, heating regions 241 within bore 127 of tubular body 126 may at least partially melt sealing elements 240. Alternatively, welds W may be heated subsequent to formation thereof for at least partially melting sealing elements 240. Of course, a welding apparatus 210 as described above may be employed for heating a region of a casing section 120, such as heating regions 241. At least partially melting the sealing elements 240 may be advantageous for providing additional resistance to leakage through adjacent casing strings 142 of a subterranean barrier 140.

Figure 7A:
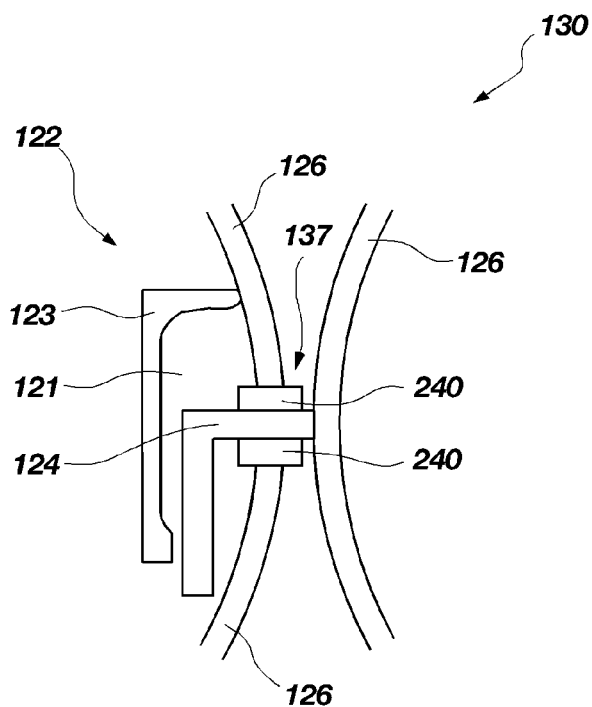
FIG. 7A shows an enlarged partial cross-sectional view of another embodiment of an interlocking structure according to the present invention including sealing elements.

In another exemplary interlocking structure embodiment according to the present invention, FIG. 7A shows a partial cross-sectional view of a portion of interlocking structure 130 including two interlocked, adjacent casing sections 120, each casing section 120 including a tubular body 126 forming a bore 127, generally as described above with respect to FIGS. 5A and 5B. Female interlocking structure 122 includes an interior guide feature 128, which forms, in combination with portions of its associated tubular body 126, a recess 121. Male interlocking structure 124, as shown in FIG. 7A, is configured as a generally L-shaped feature, having a leg section thereof extending toward the tubular body 126 of casing section 120. Further, sealing elements 240 may be positioned between the male interlocking structure 124 and the opening 137 of female interlocking structure 122.

Figure 7B:
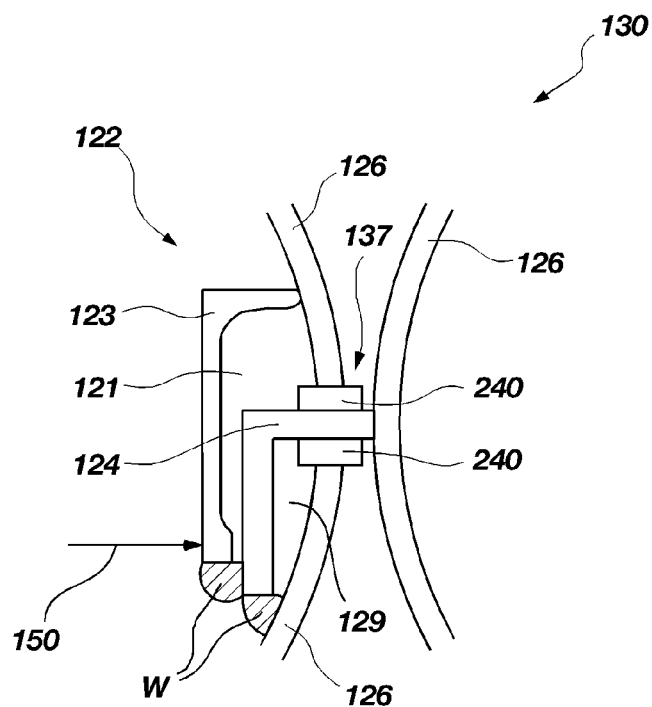
FIG. 7B shows the enlarged partial cross-sectional view of the interlocking structure shown in FIG. 7A, including welds formed therein.

Turning to FIG. 7B, welds W may be formed upon the end regions of both L-shaped male interlocking structure 124 as well as interior guide feature 128, for affixing the L-shaped male interlocking structure 124 to the interior guide feature 128 and the L-shaped male interlocking structure 124 to the tubular body 126 of casing section 120. As shown in FIG. 7B, formation of welds W substantially closes recess 121 and recess 129. Once recess 121 and recess 129 are substantially closed, one or both may be filled with a sealant or filler material. More generally, any space or volume within the female interlocking structure 122 not occupied with male interlocking structure 124 may be filled with a sealant such as grout or bentonite to provide further resistance to permeation.

Optionally, a force 150 may be applied for biasing an end region of interior guide feature 128 toward L-shaped male interlocking structure 124 during formation of the weld W therebetween. Force 150 may be generated or applied by way of a welding apparatus 210 (FIG. 3A). Alternatively, if force 150 is of sufficient magnitude, both the L-shaped male interlocking structure 124 and the interior guide feature 128 may be biased toward the tubular body 126 of casing section 120. Thus, at least one of the interior guide feature 128 and the L-shaped male interlocking structure 124 may be fixed by a weld in a biased position. Explaining further, biasing or biased refers to displacement from an equilibrium position, wherein an equilibrium position may be a position of a male or female interlocking structure as they are at least partially cooperatively engaged with one another but generally free from external forces. Of course, a male and a female interlocking structure may be biased (e.g., exert or produce forces upon one another) by virtue of at least partially cooperatively engaging one another. Additionally, biasing of a male or female interlocking structure may develop stresses therein in response to such biasing. Thus, at least one of the interior guide feature 128 and the L-shaped male interlocking structure 124 may be fixed by a weld in a stressed condition.

Biasing one or both of L-shaped male interlocking structure 124 and the interior guide feature 128 may be desirable for improving the characteristics of at least one of welds W. Also, such a configuration may reduce the number of welds W that must be formed to substantially seal the interlocking structure 130 along its longitudinal extent. Further, reducing the number of welds W formed for substantially sealing an interlocking structure 130 may also simplify the apparatus or methods for verification of the integrity of the welds W, which may be advantageous.

Figure 8A:
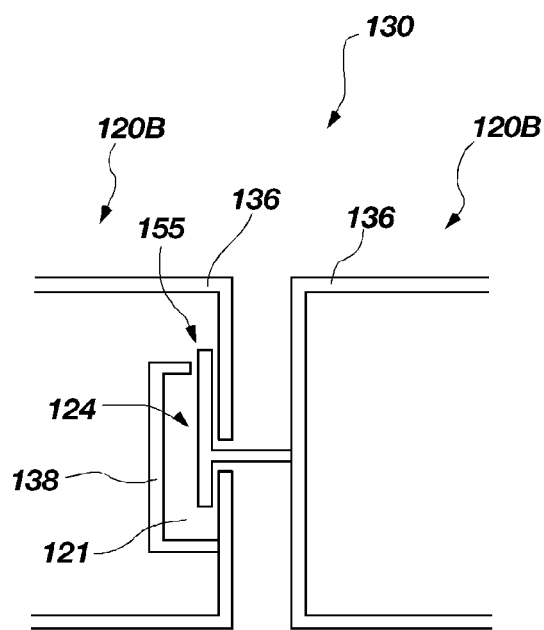
FIG. 8A shows an enlarged partial cross-sectional view of another embodiment of an interlocking structure according to the present invention.

In yet a further exemplary embodiment of an interlocking structure 130 according to the present invention, FIG. 8A shows two adjacent, substantially rectangular casing sections 120B. Casing sections 120B are interlocked to one another via interlocking structure 130 including an unsymmetrical T-shaped male interlocking structure 124, and an associated female interlocking structure 122, formed, in part, by a partially C-shaped interior guide feature 138. Interior guide feature 138 forms, in combination with portions of its associated tubular body 136, a recess 121 having an opening 155 formed between interior guide feature 138 and tubular body 136. As shown in FIG. 8A, the upper end of male interlocking structure 124 may be sized and configured to be generally within opening 155, proximate both the C-shaped interior guide feature 138 as well as tubular body 136 of the casing section 120.

Figure 8B:
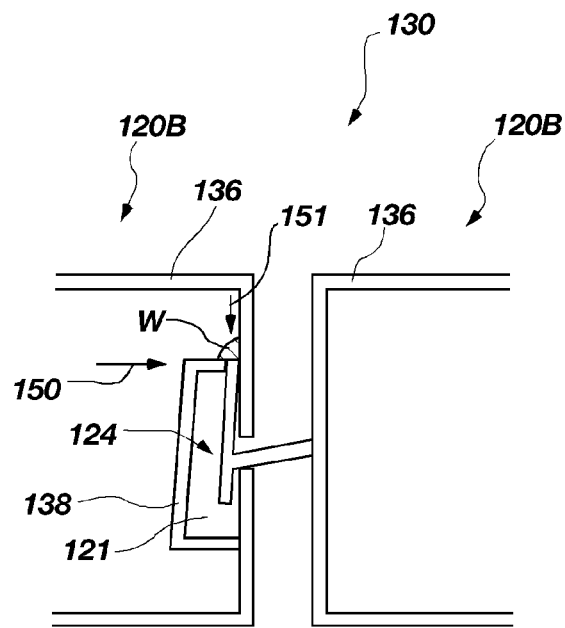
FIG. 8B shows the enlarged partial cross-sectional view of the interlocking structure shown in FIG. 8A, including welds formed therein.

Turning to FIG. 8B, weld W may be formed upon the end regions of both T-shaped male interlocking structure 124 as well as the partially C-shaped interior guide feature 138, for affixing the T-shaped male interlocking structure 124 to the interior guide feature 138 and the T-shaped male interlocking structure 124 to the tubular body 136 of casing section 120B. As shown in FIG. 7B, formation of weld W may substantially close or seal recess 121. As explained above, once recess 121 is substantially closed, it may be filled with a sealant or filler material.

Optionally, force 150, force 151, both or a selected force may be applied to at least one of partially C-shaped interior guide feature 128 and T-shaped male interlocking structure 124 for biasing an end region of partially C-shaped interior guide feature 128 toward substantially tubular body 136 of casing section 120B during formation of the weld W therebetween. Such biasing may be considered in the design of at least one of the male interlocking structure 124 and the female interlocking structure 122. Put another way, at least one of the male interlocking structure 124 and the female interlocking structure 122 may be designed for exhibiting a desired magnitude of displacement in response to an anticipated magnitude of force applied thereto in a selected direction.

Forces 150 and 151 may be generated, for instance, by way of welding apparatus 210 (FIG. 3A). Biasing partially C-shaped male interlocking structure 124 and the interior guide feature 128 may be desirable for improving at least one characteristic of weld W. Also, as shown in FIG. 8B, such a configuration may require but a single weld W to substantially seal the interlocking structure 130 along its longitudinal extent. Of course, forming a single weld W may simplify the apparatus or methods for verification of the integrity thereof, which may be advantageous.

In addition, although the present invention is generally described as pertaining to interlocked casing sections or casing strings, the present invention is not so limited. Rather, generally, the present invention contemplates a plurality of tubular casing strings positioned within a subterranean formation, wherein at least two of the plurality of tubular casing strings are structured and positioned with respect to one another for forming at least one weld therebetween. Thus, the present invention contemplates that two adjacent casing sections (of two adjacent casing strings) may include welding structures and may be positioned so that those welding structures abut or lie proximate one another for forming at least one weld therebetween, without limitation.

Figure 9:
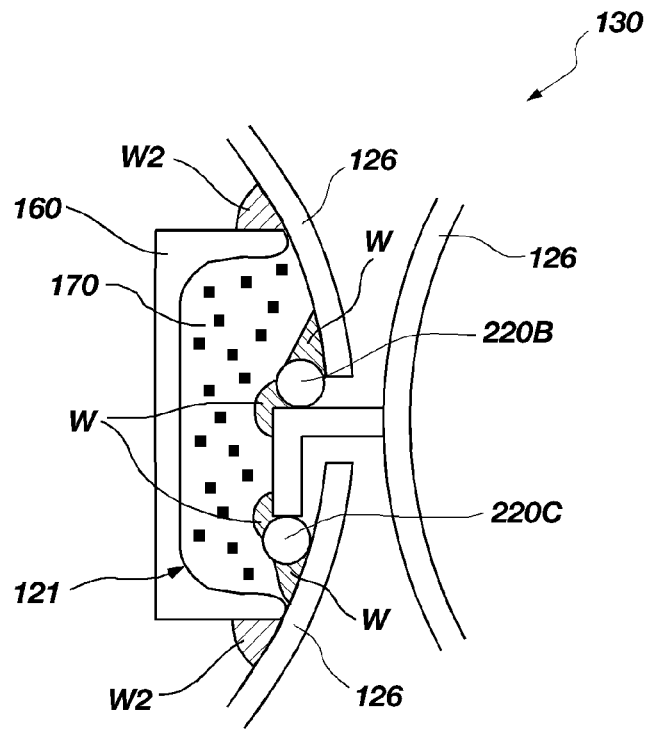
FIG. 9 shows an enlarged partial cross-sectional view of another embodiment of an interlocking structure including a channel feature and filler material within a recess of the interlocking structure.

As may be appreciated from the above description, the present invention contemplates many different configurations and possible configurations and structures pertaining to interlocking structures of casing strings. For instance, a substantially sealed recess may be formed subsequent to substantially sealing an interlocking structure via at least one weld. More specifically, FIG. 9 shows the interlock structure shown in FIG. 5B, but including a channel feature 160. Channel feature 160 may be welded, subsequent to welds W being formed, to tubular body 126 of casing section 120 via welds W2 by way of a welding apparatus as described above to form a substantially closed recess 121. As shown in FIG. 9, substantially closed recess 121 may be filled with a filler material 170.

Generally, as mentioned hereinabove, subsequent to welding adjacent casing sections 120 of casing strings 142 (FIG. 1A) as well as interlocking structures of adjacent casing sections 120, at least a portion of casing strings 142 or casing sections 120 comprising same may be preferably substantially filled (within their bores 127, recesses 121, or both) with a filler material (not shown) such as grout, wax, rubbers, tar, polymeric sealants, thermoplastic polymers, thermoset polymers, cement, concrete, bentonite-based materials, modified cement, polysiloxane, acrylic polymers, or the like. Some of these filler materials, such as the thermoplastic polymers, waxes, and tar may also possess a degree of "self-healing" ability being able to slowly flow or move to recreate a breached seal without further intervention.

For instance, filler material may comprise a tar which is flowed within casing strings 142 (FIG. 1) and interlocking structures thereof and subsequently solidifies to form a substantially leak-tight subterranean barrier 140 (FIG. 1). More generally, filler material comprising a liquid, slurry, granular material, or other flowable state (i.e., freely movable) may be disposed within the interlocking structures and, optionally, may be subsequently solidified to form a substantially continuous leak-tight subterranean barrier 140. Also, as known in the art, filler material disposed within bores 127, recesses 121, or both of casing sections 120 may produce a subterranean barrier 140 that is relatively chemically stable, even when exposed to solutions saturated with calcite, gypsum, or other reactive solutions.

Such a barrier configuration may be desirable, because a subterranean barrier 140 including interlocked casing strings 142 (FIG. 1) as well as including filler material (not shown) may exhibit a high degree of structural continuity and strength. Additionally, such a subterranean barrier 140 may demonstrate a relatively low hydraulic conductivity, which means that subterranean barrier 140 may be substantially impermeable to leachate or gas emitted from buried waste 133 (FIG. 1). Subterranean barrier 140 may also be thermally stable and may retain its structural integrity and hydraulic conductivity under a wide variety of physical and thermal conditions including ground shifting, and relatively large temperature gradients. Also, subterranean barrier 140 may be configured for use in environments that experience cyclical freeze and thaw temperature conditions and in environments where precipitation may cause the presence of groundwater flow.

However, even a barrier that is filled with a material may eventually develop a leak due to repeated thermal stresses, displacement or shifting of the casing strings, or other environmental influences. Conventionally, a specialized repair apparatus, such as a remote-controlled robot that fits inside a casing string 142, may be moved to the location of a detected void for removal thereof. Further, a drill or other machining or material removal tool may be employed via the remote-controlled robot to remove a sufficient portion of the filler material such that the void is removed. Then, the void may be filled with additional barrier filler. Such a process may be analogized to the process of dental filling. Furthermore, such a process may be relatively time consuming and difficult to perform. Of course, filler material within the casing string 142 would need to be removed, if present to allow for a remote-controlled robot to travel therein. Alternatively, only the interlocking structures of a barrier may be filled with filler material.

Figure 10:
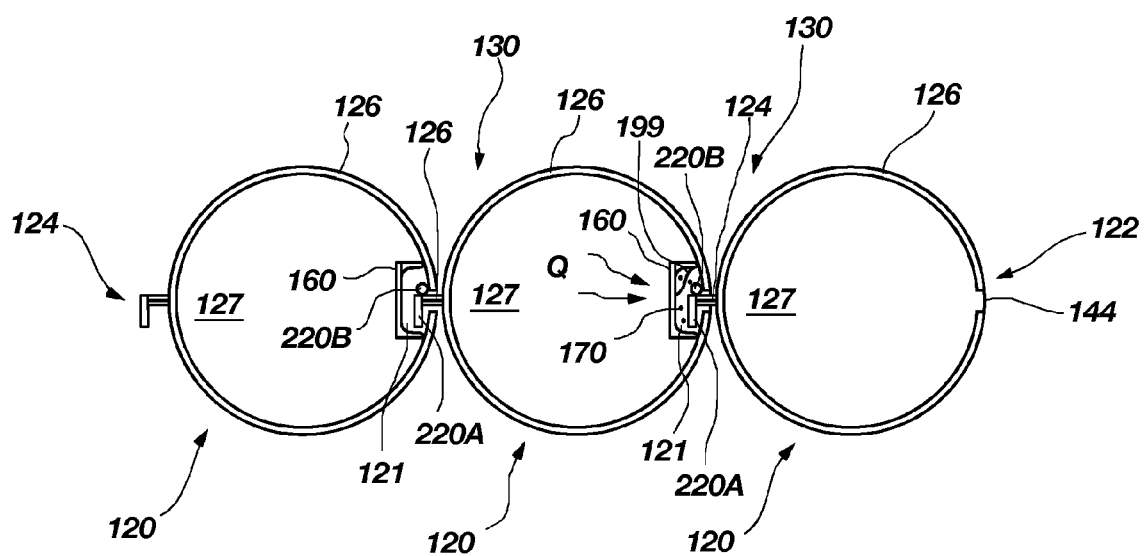
FIG. 10 shows a cross-sectional view of three interlocked, adjacent casing sections that may form a portion of the subterranean barrier shown in FIG. 1 during selective heating thereof for repairing of filler material within a recess of an interlocking structure.

Accordingly, in another aspect of the present invention, a heating apparatus, such as a welding apparatus as described above may be employed to selectively heat at least a portion of at least one casing string of a barrier, as described briefly hereinabove. For instance, selectively heating at least a portion of at least one casing string of a barrier may be advantageous for repairing cracks in filling material. As mentioned above, interlocking structures of adjacent casing sections may be preferably substantially filled with a filler material such as grout, wax, tar, cement, concrete, bentonite-based materials, modified cement, polysiloxane, acrylic polymers, or the like. More particularly, FIG. 10 shows three adjacent casing sections 120 interlocked with one another. Each of casing sections 120 is substantially identical and each includes three female interlocking structures 122 and one male interlocking structure 124. As shown in FIG. 10, filler material 170 is disposed within recess 121 of interlocking structure 130 and included flaw 199. Interlocking structure 130 may be structured and formed generally as described and shown in FIG. 9. Further, selectively heating the channel feature 160 may mend or repair flaw 199. As shown in FIG. 10, heat Q is applied generally toward the channel feature 160.

Heat Q may be generated by a welding apparatus or, alternatively, a heating apparatus. Heat may be generated as known in the art, for instance, heat Q may be generated by a laser beam, induction heating, electrical current, a torch or flame, or combinations thereof. Selectively heating a desired longitudinal region of a casing section 120 may be advantageous for efficiently repairing a portion of a subterranean barrier 140. Alternatively, selectively heating at least a portion of a casing string of a barrier may be desirable for expanding or curing filler material disposed within a bore of a casing section or a recess of an interlocking structure. Of course, heating may be applied from one casing string 142 for heating an adjacent casing string. Further, heating at least a portion of a casing string may facilitate filling thereof with filler material. For instance, if the bore or recess is heated prior to or during filling with wax or tar, such may flow more easily therein.

In a further aspect of the present invention, the present invention contemplates that an adhesive may be deposited between a female interlocking structure of one casing string and a male interlocking structure of another adjacent casing string for forming an adhesive bond therebetween. Such a configuration may be analogized to the above-description regarding forming at least one weld, except that at least one adhesive region may be formed. Thus, the present invention contemplates that any of the above-described embodiments may include an adhesive region formed in the position and configuration as is shown and described with respect to welds W but in place thereof. Further, the present invention contemplates that welds, adhesive regions, or combinations thereof may be employed for affixing or bonding one casing string to an adjacent casing string, without limitation.

Figure 11A:
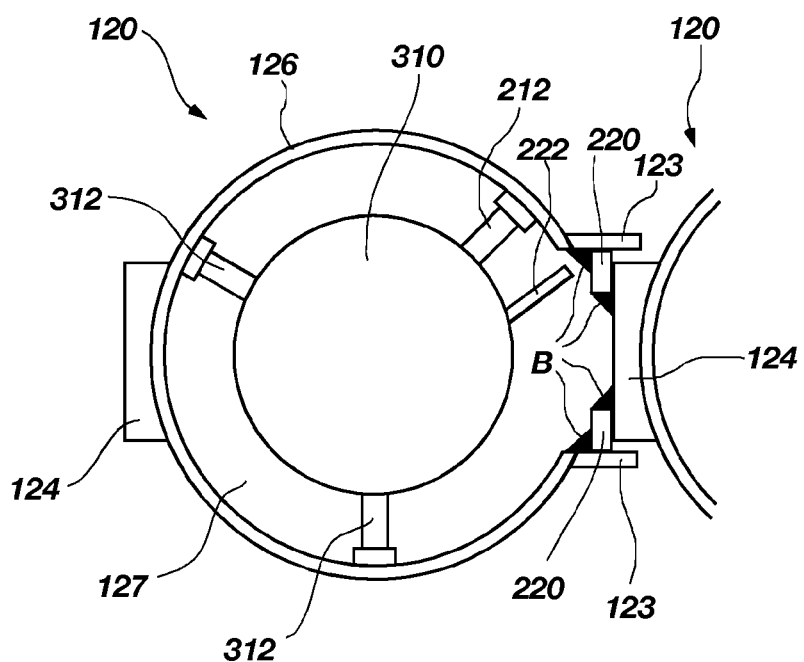
FIG. 11A shows an enlarged partial cross-sectional view of the interlocking structure shown in FIG. 2, including a adhesive affixation apparatus including a single adhesive deposition head positioned within a bore of one of the casing sections.

For example, an adhesive affixation process according to the present invention will be described with reference to FIGS. 11A-11B. Particularly, FIG. 11A shows a partial side cross-sectional view of two casing sections 120 of respective, adjacent, interlocked casing strings 142, as shown in FIG. 2, including an adhesive affixation apparatus 310 positioned within bore 127 of one casing section 120 by positioning legs 312. Positioning legs 312 may include one or more wheels and may be biased by way of a biasing element (not shown) configured for positioning adhesive affixation apparatus 310 within a bore of a substantially tubular structure, such as the (substantially circular) bore 127 of casing section 120. Also, adhesive affixation apparatus 310 may be movable along the length of a casing string 142, within a bore 127 of one of the plurality of casing sections 120 comprising same. Of course, adhesive affixation apparatus 310 may be configured for depositing an adhesive between of casing strings 142. In one example, an adhesive may be deposited as a flowable material that subsequently at least partially cures or hardens. Additionally, adhesive affixation apparatus 310 may include apparatus for hardening or curing an adhesive (e.g., light or heat). However, the present invention contemplates that an adhesive deposited by adhesive affixation apparatus 310 may comprise any adhesive as known in the art, without limitation. For example, an adhesive deposited by adhesive affixation apparatus 310 may comprise an epoxy, an acrylic, an acrylate, a phenolic, a formaldehyde, a polyurethane, a polyester, a silicone, a vinyl, a vinyl ester, a thermosetting plastic, combinations thereof, or other adhesive formulations as known in the art.

In further detail, least one adhesive depositing head 322 may be affixed to adhesive affixation apparatus 310 and configured for movement within a bore 127 of casing section 120, so as to be selectively positionable for depositing an adhesive upon a desired portion of an interior of a casing section 120. Thus, adhesive joints B, as shown in FIG. 11A, may be formed by an adhesive affixation apparatus 310 including a single adhesive depositing head 322, as shown in FIG. 11A, configured for depositing adhesive within casing section 120 of casing string 142. Alternatively, adhesive affixation apparatus 310 may include a plurality of adhesive depositing heads (i.e., a plurality of adhesive depositing heads 322). Adhesive depositing head 222 may be at least sufficiently positionable within bore 127 for forming each of adhesive joints B, as shown in FIG. 11A. In one contemplated configuration, each of adhesive joints B shown in FIG. 11A may be formed sequentially, by positioning adhesive depositing head 322 proximate a desired region of the side cross-sectional region of a casing section 120 and operating adhesive depositing head 322 while moving adhesive depositing head 322 longitudinally within the bore 127 of casing section 120. For example, adhesive depositing head 322 may comprise a nozzle for supplying adhesive toward a region desired to be adhesively bonded.

As explained above with respect to welding, it may be advantageous to employ closure elements for closing gaps between a male interlocking structure and a female interlocking structure. For instance, in one embodiment, as shown in FIG. 11A, closure elements 220 may be placed adjacent guide features 123 and male interlocking structure 124, respectively. Closure elements 220 may be configured for substantially or completely closing, collectively and upon welding of each closure element 220 to a respective guide feature 123 and a respective portion of male interlocking structure 124, gaps g formed between the female interlocking structure 122 and the male interlocking structure 124. Put another way, since clearance between male interlocking structure 124 and guide features 123 may be desirable for assembling adjacent casing strings 142 to one another, a closure element 220 may be configured for matingly engaging both a guide feature 123 and a male interlocking structure 124 so as to substantially or completely close the clearance or gap upon welding of the closure element 220 to both the male interlocking structure 124 and a guide feature 123.

Of course, adhesive depositing apparatus 310 may be configured for positioning closure elements 220 in a desired position, as shown in FIG. 11A. In one embodiment, closure elements 220 may comprise a so-called "bar stock," comprising an elongated body having a substantially constant cross section and comprising a material such as, for instance, steel, aluminum, a polymer, or another material compatible for adhesively affixing male interlocking structure 124 and guide feature 123, and may exhibit a cross-sectional shape that is suitable for matingly engaging, if properly positioned, both a guide feature 123 and the male interlocking structure 124. Alternatively, closure elements 220 may comprise a polymer such as PVC, HDPE, polypropylene, PVDF, or the like, without limitation.

Thus, generally, according to the present invention, at least one weld may be formed for joining a male interlocking structure to a female interlocking structure. In a further example, as shown in FIG. 11B, which shows an interlocking structure as shown in FIG. 5B, adhesive joints B may be formed along and around each of closure elements 220, affixing each of closure elements 220 to a respective guide feature 123 and a respective male interlocking structure 124. Adhesive joints B may extend substantially continuously along the longitudinal extent of each of closure elements 220. It may be appreciated that adhesive joints B are shown as substantially surrounding closure elements 220, which may be effected by applying adhesive in a region desired to be adhesively affixed and then positioning closure elements 220 thereinto.

Figure 11B:
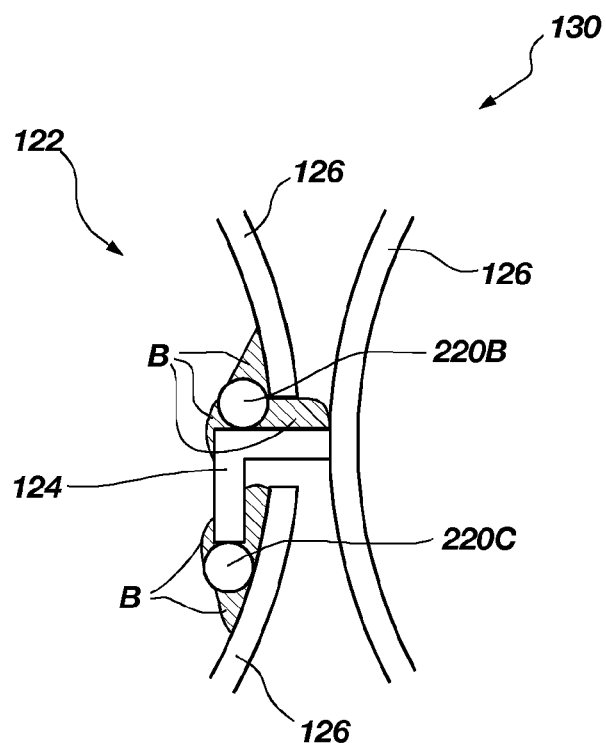
FIG. 11B shows an enlarged partial cross-sectional view of the interlocking structure as shown in FIG. 5A, including adhesive joints formed therein.

More specifically, FIG. 11B shows an enlarged side cross-sectional view of interlocking structure 130, including substantially cylindrical, differently sized, substantially circular closure element sections 220B and 220C and adhesive joints B. More specifically, two of adhesive joints B are formed between the male interlocking structure 124 and both closure element sections 220B and 220C, respectively. Further, two of adhesive joints B are formed between closure element sections 220B and 220C. Thus, male interlocking structure 124 may be described as being indirectly affixed or joined to female interlocking structure 122 through substantially circular closure element sections 220B and 220C.

Thus, in general, at least two casing strings 142 may be adjoined or affixed to one another through at least one adhesive joint B. Particularly, as mentioned above, an adhesive joint B may be interchangeable, for purposes of disclosure, with a weld W or W2 as shown in any of the above-described embodiments. Further, adhesive joint B may be formed according to any of the above-described methods as disclosed above with respect to a weld W or W2. Optionally, at least one weld and at least one adhesive joint may be used in combination with one another for joining at least two casing strings to one another.

Also, as shown in FIGS. 11A and 11B, at least two casing strings 142 may be adjoined or affixed to one another through a plurality of adhesive joints B. Further, formation of adhesive joints B may substantially seal the interior of bore 127 of a casing section 120. Also, forming adhesive joints B along substantially the entire longitudinal length of a plurality of casing sections 120 comprising a casing string 142 may substantially seal the interior bore 127 thereof. Such a configuration may be desirable for preventing leaks through a subterranean barrier 140 including a plurality of casing strings 142 so configured.

While the present invention has been described herein with respect to certain exemplary embodiments, those of ordinary skill in the art will recognize and appreciate that it is not so limited. Rather, many additions, deletions and modifications to the exemplary embodiments may be made without departing from the scope of the invention as hereinafter claimed. In addition, features from one embodiment may be combined with features of another embodiment while still being encompassed within the scope of the invention as contemplated by the inventors. Therefore, the invention is to cover all modifications, equivalents, and alternatives falling within the spirit and scope of the invention as defined by the following appended claims.

What is claimed is:

1. A method of forming a subterranean baffler adjacent a selected region of a subterranean formation, comprising:
    placing a plurality of casing strings within a subterranean formation, each casing string of the plurality of casing strings comprising a bore extending longitudinally through at least a portion thereof, each of the plurality of casing strings being laterally adjacent to at least one other casing string of the plurality of casing strings;
    interlocking each casing string of the plurality of casing strings to at least one adjacent casing string through an interlocking structure extending between at least one casing string of the plurality of casing strings and at least another adjacent casing string of the plurality of casing strings;
    joining at least two laterally adjacent casing strings of the plurality of casing strings to one another by forming at least one weld substantially longitudinally along the interlocking structure formed between two adjacent casing strings; and
    disposing baffler filler material at least partially within the interlocking structure.

2. The method of claim 1, wherein forming the at least one weld comprises a weld selected from the group consisting of gas welding, arc welding, gas-shielded arc welding, oxyfuel welding, laser welding, induction welding, electron beam welding, chemical welding, ultrasonic welding, and resistance welding.

3. The method of claim 1, wherein interlocking the at least two casing strings comprises positioning a male interlocking structure at least partially within a female interlocking structure.

4. The method of claim 3, wherein joining the at least two laterally adjacent casing strings of the plurality of casing strings to one another by forming the at least one weld comprises forming at least one weld between one of the at least two laterally adjacent casing strings and one of the male interlocking structure and the female interlocking structure.

5. The method of claim 3, further comprising displacing at least one of the male interlocking structure and the female interlocking structure in relation to an equilibrium condition thereof during forming the at least one weld.

6. The method of claim 1, further comprising substantially filling at least one interlocking structure extending between two laterally adjacent casing strings of the plurality with barrier filler material.

7. The method of claim 1, wherein joining the at least two laterally adjacent casing strings of the plurality of casing strings to one another by forming the at least one weld comprises forming a plurality of welds.

8. The method of claim 1, wherein joining at least two laterally adjacent casing strings of the plurality of casing strings to one another by forming at least one weld comprises positioning a welding apparatus within one of the at least two laterally adjacent casing strings of the plurality of casing strings and operating the welding apparatus so as to form the at least one weld.

9. The method of claim 8, further comprising moving the welding apparatus within the one of the at least two laterally adjacent casing strings of the plurality of casing strings while operating the welding apparatus so as to form the at least one weld.

* * * * *